Feb. 5, 1952          L. POGACSNIK          2,584,915

BOWLING PIN REFINISHING LATHE

Filed Aug. 13, 1947          3 Sheets-Sheet 1

INVENTOR.
LEOPOLD POGACSNIK
BY
Gustav A. Wolff
ATT.

Feb. 5, 1952 — L. POGACSNIK — 2,584,915
BOWLING PIN REFINISHING LATHE
Filed Aug. 13, 1947 — 3 Sheets-Sheet 2

INVENTOR.
LEOPOLD POGACSNIK
BY
ATT.

Feb. 5, 1952     L. POGACSNIK     2,584,915

BOWLING PIN REFINISHING LATHE

Filed Aug. 13, 1947     3 Sheets-Sheet 3

INVENTOR.
*LEOPOLD POGACSNIK*
BY

*Gustav A. Wolff.*

ATT.

Patented Feb. 5, 1952

2,584,915

UNITED STATES PATENT OFFICE 2,584,915

BOWLING PIN REFINISHING LATHE

Leopold Pogacsnik, Cleveland, Ohio

Application August 13, 1947, Serial No. 768,415

4 Claims. (Cl. 144—2)

This invention relates in general to new and useful improvements in wood working machinery and, more particularly, to a specifically constructed lathe for turning and refinishing damaged bowling pins.

The general object of the invention is the provision of a specifically constructed, simple, accurate and inexpensive lathe for refinishing damaged bowling pins, which lathe includes a pivotally supported, laterally adjustable tool post, a plurality of cutting tools, and permitting simultaneously sizing and refinishing the bottom and side walls of a damaged bowling pin.

Another object of the invention is the provision of a specifically constructed lathe for refinishing damaged bowling pins, which lathe includes a pivotally supported, laterally adjustable tool post for a plurality of cutting and sizing tools and adjustable stop means adapted to limit lateral movement of said tool post to predetermined positions.

A further object of the invention is the provision of a specifically constructed lathe for refinishing damaged bowling pins, which lathe includes a specifically constructed head stock, a tail stock, a pivotally supported, laterally adjustable tool post and a polishing member rectangularly related to the axis of rotation of the lathe centers, the polishing member being mounted to be laterally and vertically shifted, so that the lathe with a single set up effects recutting and polishing of a damaged bowling pin.

In addition, the invention has other marked improvements and superiorities which radically distinguish it from presently known structures. These improvements or superior characteristics embodying certain novel features of construction are clearly set forth in the appended claims; and an embodiment of the invention is hereinafter shown with reference to the accompanying drawings forming part of the specification.

Figure 1:
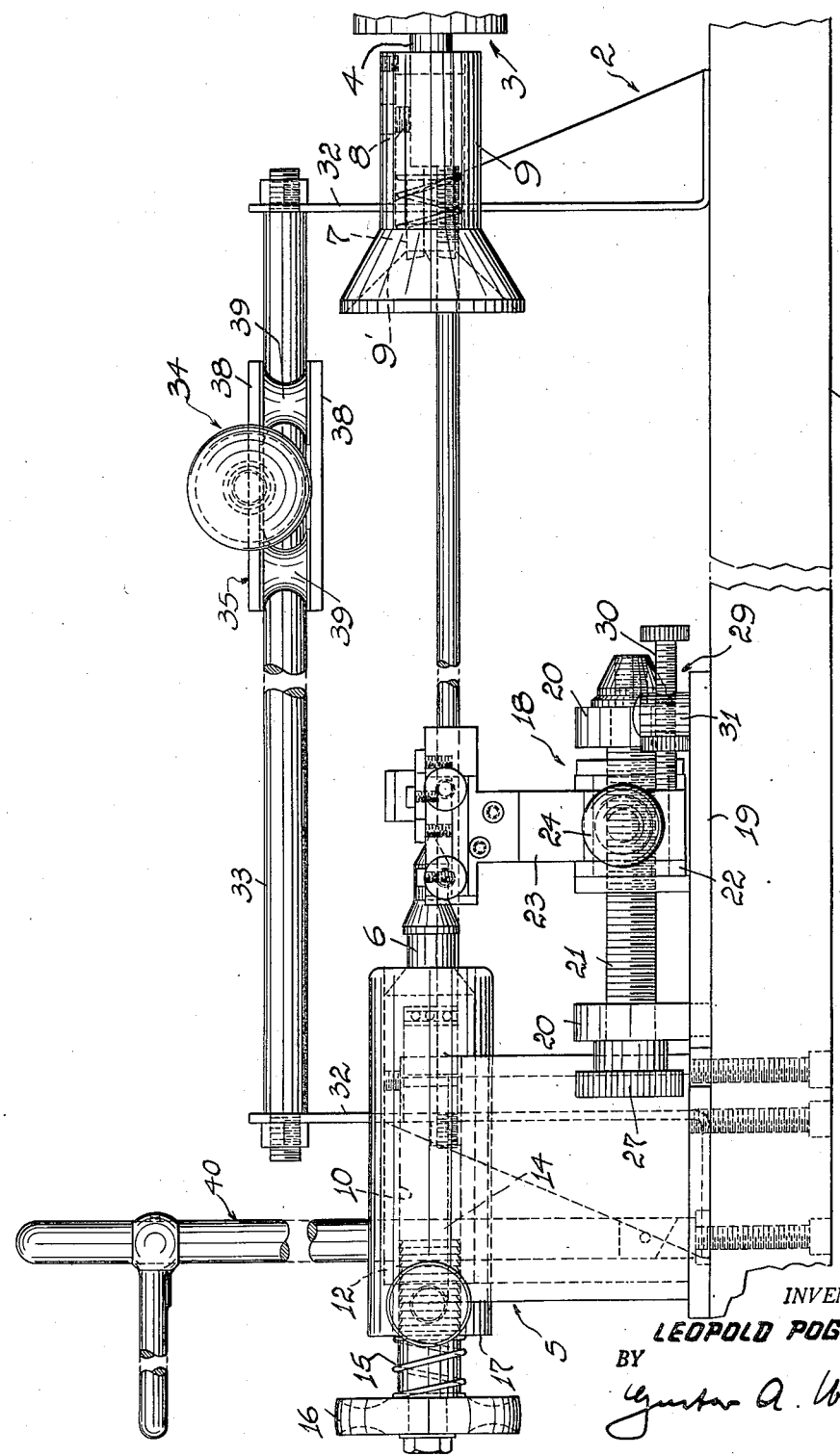
Fig. 1 is a front elevation of a lathe built in accordance with the invention.
Figure 2:
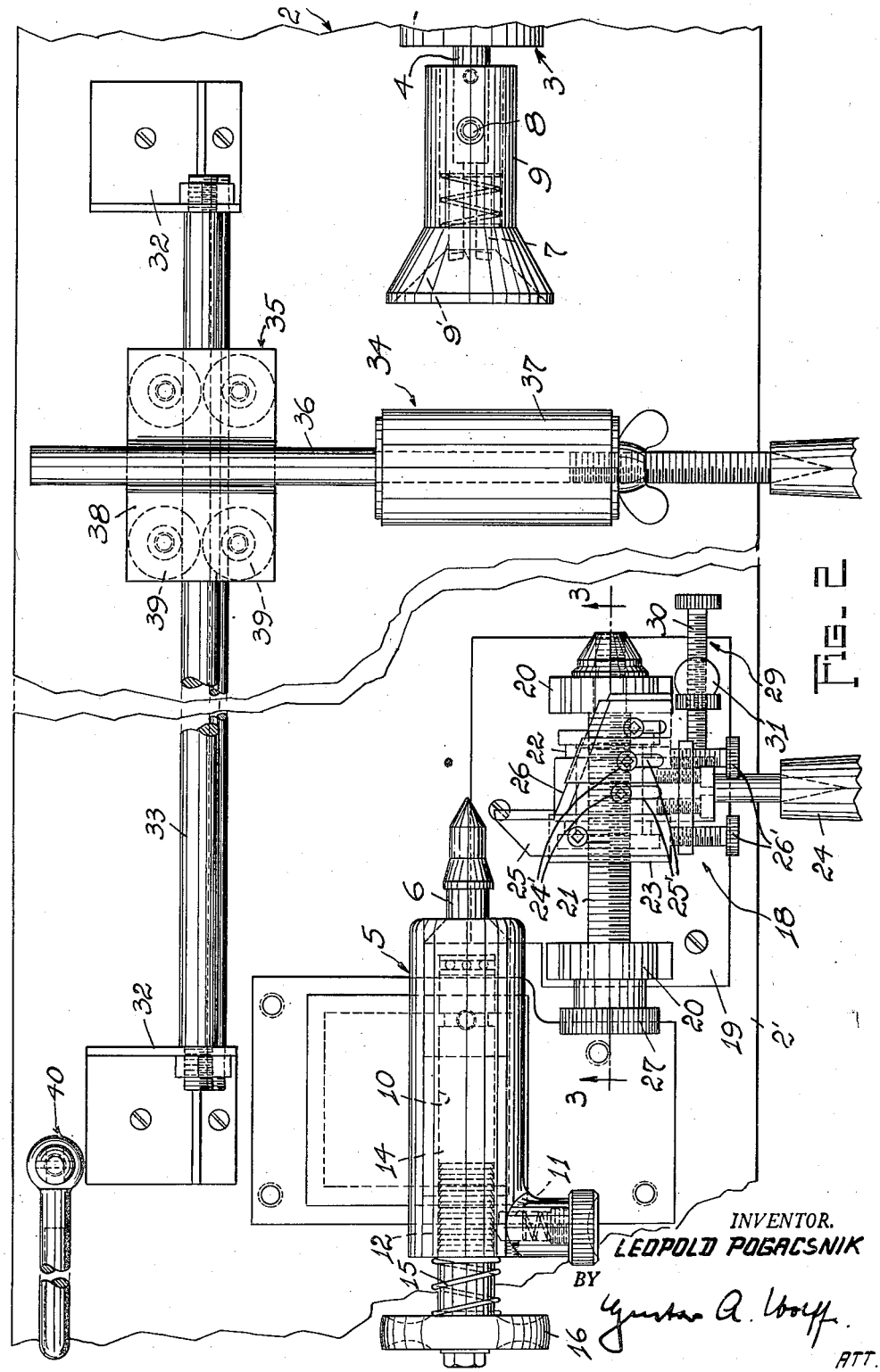
Fig. 2 is a plain elevation of the lathe shown in Fig. 1.
Figure 3:
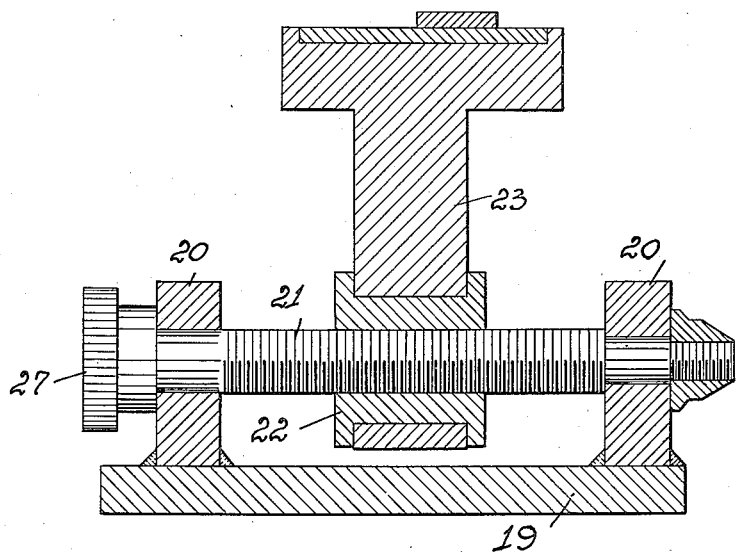
Fig. 3 is a sectional view through the tool post of the lathe structure, the section being taken on line 3—3 of Fig. 2.
Figure 4:
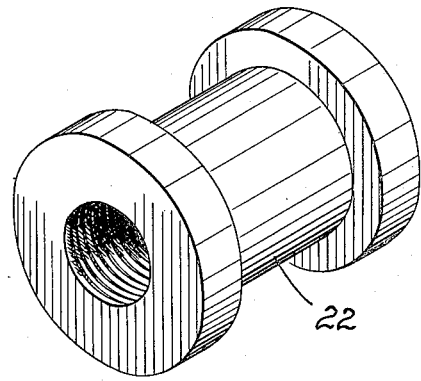
Fig. 4 is a perspective view of the internally threaded bearing member pivotally supporting the tool post of the lathe structure.

Referring now to the exemplified form of the structure shown in the drawing, reference numeral 2 denotes a lathe, the table or frame 2' of which mounts, as customary, a headstock 3 with a live spindle 4 and a tailstock 5 with an axially shiftable dead-spindle 6. Live spindle 4 supports a center-bit 7 which is secured thereto by a screw 8 and carries a spring-pressed shiftable centering sleeve 9 having a cone-shaped recess 9' adapted to center the head of a bowling pin with respect to center-bit 7. Tailstock 5 slidably mounts in its longitudinal bore 10 the dead-spindle 6 which is held in proper position by a spring-pressed plunger 11 engaged with circular ratchet teeth 12 on the end portion 14 of spindle 6. The dead-spindle 6 is retracted from its working position by a compression spring 15 seated between wheel-like knob 16 at the outer end of dead-spindle 6 and side wall 17 of tailstock 5 when the plunger 11 is withdrawn from engagement with circular ratchet teeth 12.

Frame 2' in addition to head- and tailstock 3 and 5, respectively, mounts a tool post member 18, the base 19 of which rotatably supports in oppositely arranged vertical posts 20 a threaded rod 21. This rod mounts a bearing member 22 threadedly engaged therewith, and this bearing member pivotally supports a tool post 23 so as to swing in a plane rectangularly related to the axis of the centers of the lathe. Tool post 23 carries a handle 24 for manual control and adjustably supports a plurality of cutters, to wit: a cutter 25 for facing the bottom of a bowling pin, and a cutter 26 for recutting the side wall of such pin, which cutters are secured to tool post 23 by head screws 24' extended through elongated slots 25' in said cutters, and which cutters are axially shiftable by screw members 26' mounted in tool post 23 so as to contact said cutters.

These cutters 25, 26 engage a work piece mounted in the lathe when tool post 23 is tilted toward the work piece and when lateral shifting of the tool post is effected by manual rotation of threaded rod 21, a rotation facilitated by knob 27 at one end of the threaded rod. Lateral shifting of bearing member 22 is limited to predetermined positions by an adjustable stop member 29 which consists of a headed screw member 30 threadedly engaged with a post 31 on base 19. The screw member is extended through said post opposite to bearing member 22 to stop its lateral shifting in a predetermined position. Frame 2' furthermore supports on oppositely arranged brackets 32 a guide rod 33 for a finishing and polishing roller member 34 which consists of a carriage 35 slidably mounting a bearing rod 36 in turn rotatably supporting a finishing and polishing roller 37. The carriage 35 embodies spaced plates 38 which mount double cone-shaped rollers 39 adapted to guide carriage 35 on guide rod 33 and permit tilting and lateral shifting of the carriage.

A height gage 40 mounted on frame 2' permits determining of the length of the bowling pins prior to recutting operations for setting the stop member 29 to the desired height of the bowling pins to be refinished.

In refinishing operations on a bowling pin after stop member 29 has been set to the desired position and such bowling pin has been mounted between the centers of the lathe, cutting operations are effected by tilting tool post 23 toward the work piece. Such cutting operations are continued by shifting tool post 23 laterally after each cut until bearing member 22 contacts stop member 29. At this time recutting operations are terminated and final finishing operations are effected by a finishing and polishing roller member 34. The refinished bowling pin is readily and quickly removed from the lathe by pulling plunger 11 out of engagement with the ratchet teeth 12 on dead-spindle 6, so that spring 15 shifts the dead-spindle out of engagement with the bowling pin and permtis ready, unobstructed removal of the pin from the lathe.

Having thus described my invention, what I claim is:

1. In a wood working lathe a frame, a headstock, a tailstock, and a tool post member, said tool post member including a base member secured to said frame, a screw member swiveled to said base member in parallel relation with respect to the longitudinal axis of the lathe, a cylindrical bearing member axially threaded upon said screw member, and a tool post journaled on the cylindrical surface of the bearing member to swing in a plane angularly related to the axis of said screw member.

2. In a wood working lathe a frame, a headstock, a tailstock, and a tool post member, said tool post member including a base member mounted on said frame, a screw member swiveled to said base member in parallel relation with respect to the longitudinal axis of the lathe, a cylindrical bearing member with an axially threaded bore threadedly engaged with said screw member, and a tool post having a lower end portion journaled on the cylindrical surface of said bearing member to swing in a plane extending at a right angle to the axis of said screw member.

3. In a wood working lathe a frame, a headstock, a tailstock, and a tool post member, said tool post member including a base member mounted on said frame, a screw member swiveled to said base member in parallel relation with respect to the longitudinal axis of the lathe, a cylindrical bearing member having a peripheral bearing surface and a threaded axial bore threaded upon said screw member, and a tool post with a lower end portion journaled on the peripheral surface of said bearing member to swing in a plane extending at a right angle to the longitudinal axis of said lathe.

4. In a wood working lathe a frame, a headstock, a tailstock, and a tool post member, said tool post member including a base member supported on said frame, an elongated screw member swiveled at opposite ends to said base member, parallel to the longitudinal axis of said lathe, a bearing member having a peripheral bearing surface and spaced flanges thereon and a threaded axial bore threaded upon said screw member to be axially shifted when the screw member is rotated, and a tool post having a lower end portion journaled on the peripheral bearing surface between the flanges thereof, said tool post adapted to swing freely around said bearing member in a plane extended at a right angle to the axis of said screw member, and to be shifted jointly with said bearing member by axial rotation of said elongated screw member.

LEOPOLD POGACSNIK.

REFERENCES CITED

The following references are of record in the file of this patent:

UNITED STATES PATENTS

| Number | Name | Date |
| --- | --- | --- |
| 177,992 | Crane | May 30, 1876 |
| 1,654,502 | Johnson | Dec. 27, 1927 |
| 1,670,540 | Humphreys | May 22, 1928 |
| 1,769,333 | Coffing | July 1, 1930 |
| 1,779,085 | Blasi | Oct. 21, 1930 |
| 1,828,043 | Hedgpeth | Oct. 20, 1931 |
| 2,049,685 | Brown | Aug. 4, 1936 |
| 2,062,741 | Czerniak | Dec. 1, 1936 |
| 2,156,354 | Rozmarich | May 2, 1939 |
| 2,205,541 | Pizzotti | June 25, 1940 |
| 2,341,926 | Lauby | Feb. 15, 1944 |
| 2,351,892 | Welbury | June 20, 1944 |
| 2,383,266 | Le Tourneau | Aug. 21, 1945 |